United States Patent
Dutta et al.

(10) Patent No.: US 7,065,713 B1
(45) Date of Patent: Jun. 20, 2006

(54) APPARATUS AND METHOD FOR KEEPING AGGREGATED PORTIONS OF MULTIPLE WEB SITES SIMULTANEOUSLY DISPLAYED AND UPDATED

(75) Inventors: Rabindranath Dutta, Austin, TX (US); Mark Joseph Hamzy, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 954 days.

(21) Appl. No.: 09/710,927

(22) Filed: Nov. 9, 2000

(51) Int. Cl.
*G06F 17/00* (2006.01)

(52) U.S. Cl. ............... 715/768; 715/700; 715/799; 715/790; 715/770

(58) Field of Classification Search ............ 345/700, 345/768, 790, 799, 770, 726

See application file for complete search history.

(56) References Cited

U.S. PATENT DOCUMENTS 6,493,744 B1 * 12/2002 Emens et al. ............... 709/203

FOREIGN PATENT DOCUMENTS

FR WO 98/55914 * 10/1998
JP 11250054 * 9/1999

OTHER PUBLICATIONS

Matt Straznitskas, Mastering Photoshop 5 for the web, 1998, Sybex, Chapter 4.*

* cited by examiner

*Primary Examiner*—Kristine Kincaid
(74) *Attorney, Agent, or Firm*—David A. Mims, Jr.; Rudolf O. Siegesmund

(57) ABSTRACT

An apparatus and method for creating and automatically refreshing a composite web page. The present invention is a method, implementable in computer software, for selecting areas of interest from a plurality of web pages. The user creates a boundary around the areas of interest on each web page. The area inside the boundary, referred to as an information unit, remains visible while the area outside of the boundary becomes transparent. The user may then combine the plurality of information units together on a canvas web page. The user may then rearrange the information units on the canvas web page by dragging the information units to their intended destination. When the user has satisfactorily arranged the information units, the user may finalize the canvas web page into a composite web page. The invention may then refresh the composite web page automatically or upon user request.

12 Claims, 6 Drawing Sheets

APPARATUS AND METHOD FOR KEEPING AGGREGATED PORTIONS OF MULTIPLE WEB SITES SIMULTANEOUSLY DISPLAYED AND UPDATED

FIELD OF THE INVENTION

The present invention relates to a method and apparatus for selecting information units from one or more web sites and simultaneously displaying and updating the selected information units.

BACKGROUND OF THE INVENTION

As the amount of information that can be accessed from a computer via the Internet increases, new and useful ways to display that information are needed. A wide variety of pre-existing means for displaying data are available. A Graphical User Interface (GUI) is a visual computer environment that represents programs, files and options with graphical images, such as icons, menus, and dialog boxes on the screen. A user can select and activate these options by pointing and clicking with a mouse or with a keyboard. GUI provides standard software routines so that a particular item such as a scroll bar works the same way to the user in all applications.

While GUI simplifies moving through data, the user's reach is greatly extended by the ability of one computer to connect to one or more additional computers. The Internet is a wide area network connecting thousands of disparate networks in industry, education, government and research. The Internet uses the Transmission Control Protocol/Internet Protocol (TCP/IP) as the standard for transmitting information. An intranet is a network of organizational networks that run TCP/IP protocols and where the organizational networks are internal to a single organization. An intranet may be connected to the Internet.

The Transmission Control Protocol (TCP) is the protocol within TCP/IP that governs the breakup of data messages into packets to be sent via IP. The total set of interlinked hypertext documents residing on Hypertext Transfer Protocol (HTTP) servers all around the world is called the World Wide Web. HTTP is the protocol used to carry requests from a browser to a Web server and to transport pages back to the requesting browser.

Documents on the World Wide Web, called Web pages, are written in Hypertext Markup Language (HTML). HTML is an application of Standardized Generalized Markup Language (SGML) that uses tags to mark elements, such as text and graphics, in a document to indicate how Web browsers should display these elements to the user and should react to user actions such as activation of an element by means of a key press or mouse click. Web pages are identified by URL (Uniform Resource Locators) that specify the particular machine and pathname by which a file can be accessed. These files are transmitted from server to end user under the Hypertext Transfer Protocol (HTTP). Codes, called tags, embedded in an HTML document associate particular words and images in the document with URLs so that a user can access another file, which may be halfway around the word, at the press of a key or the click of a mouse.

Web pages are located by Web browsers. A Web browser is software that lets a user view HTML documents and access files and software related to these documents. Web browsers can provide access to documents on a network, an intranet, or the local hard drive. Navigation in Web browser software is based on hyperlinks which allow users to point and click with a mouse in order to jump from document to document in whatever order they desire.

Web browsers display acquired data on Web pages and frames. IN HTML, a frame refers to a rectangular section displayed by a Web browser that appears like a somewhat separate document from the rest of the page. In other words, the browser display can be divided into separate sections, each of which appears like a different web page.

As used herein, "aggregating information" means collection of desired information by a user by collecting and correlating the desired information at the user's computer. One current method of aggregating information is through the use of Common Gateway Interface (CGI) scripts. CGI is the specification that defines communications between information servers (such as HTTP servers) and resources on the server's host computer, such as databases and other programs. The CGI script is an external application that is executed by an HTTP server machine in response to a request by a client, such as a Web browser. The CGI may be invoked by a user clicking on an element in a Web page, such as a link or an image. Communication between the CGI script and the server is carried out via the CGI specification. CGI scripts can be written in many programming languages and can also be batch programs or compiled programs. CGI scripts are used to provide interactivity in a Web page. Active X controls and Java applets can provide similar functionality to CGI scripts though through different means. By writing specialized CGI scripts information can be aggregated.

Another method of aggregating information is through a portal. A portal is a collection of links, content and services designed to guide users to information they are likely to find interesting. For example, the type of information to which a user may be guided may be news, weather or stock quotations.

Another method of aggregating information is through "Push" technology. "Push" technology, developed in relation to the World Wide Web, is designed to provide end users with personalized Web access by having a site actively "push" requested information to the user's desktop, either automatically or at specified intervals. In other words, the user is relieved of the step of actively retrieving or "pulling" information from the Web.

Aggregating information by the user takes place at the user's desktop computer. The methods of aggregating information discussed above usually take place at the server computer and not at the client computer. In most cases, applying the above methods requires special programs that have to be written in some type of scripting or programming language or via specially designed web pages. What is needed beyond the prior art is a method to aggregate information in accordance with a user's need without the need for special programming by the user. For example, users may want to have access to web sites that display information that is updated continuously or periodically, such as bank balances, stock prices or weather reports. A user may have a number of web sites to access to review desired current information and it would be desirable to consolidate portions of each web site onto one page so that only relevant information is shown.

What is needed beyond the prior art is a way for a user to look at relevant information from several web pages at the same time. Specifically, what is needed is the ability to create a composite web page that combines selected information from multiple web pages for viewing on a single page. In addition, what is needed is a composite web page in which the composite entries will all update in response to a periodic, manual or continuous refresh capability.

SUMMARY OF THE INVENTION

The invention meeting the needs identified above is a method for identifying information units containing information capable of periodic, continuous or manual update, positioning the identified information units over a canvas page so that only the selected portions are visible. The information units are identified by enclosing a desired information item by a continuous line so that only the information within the enclosed line remains visible and the remainder of the web page, i.e. the portion outside of the enclosed line becomes transparent. The information units can be updated continuously, periodically or manually depending on the capability of the underlying web site.

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
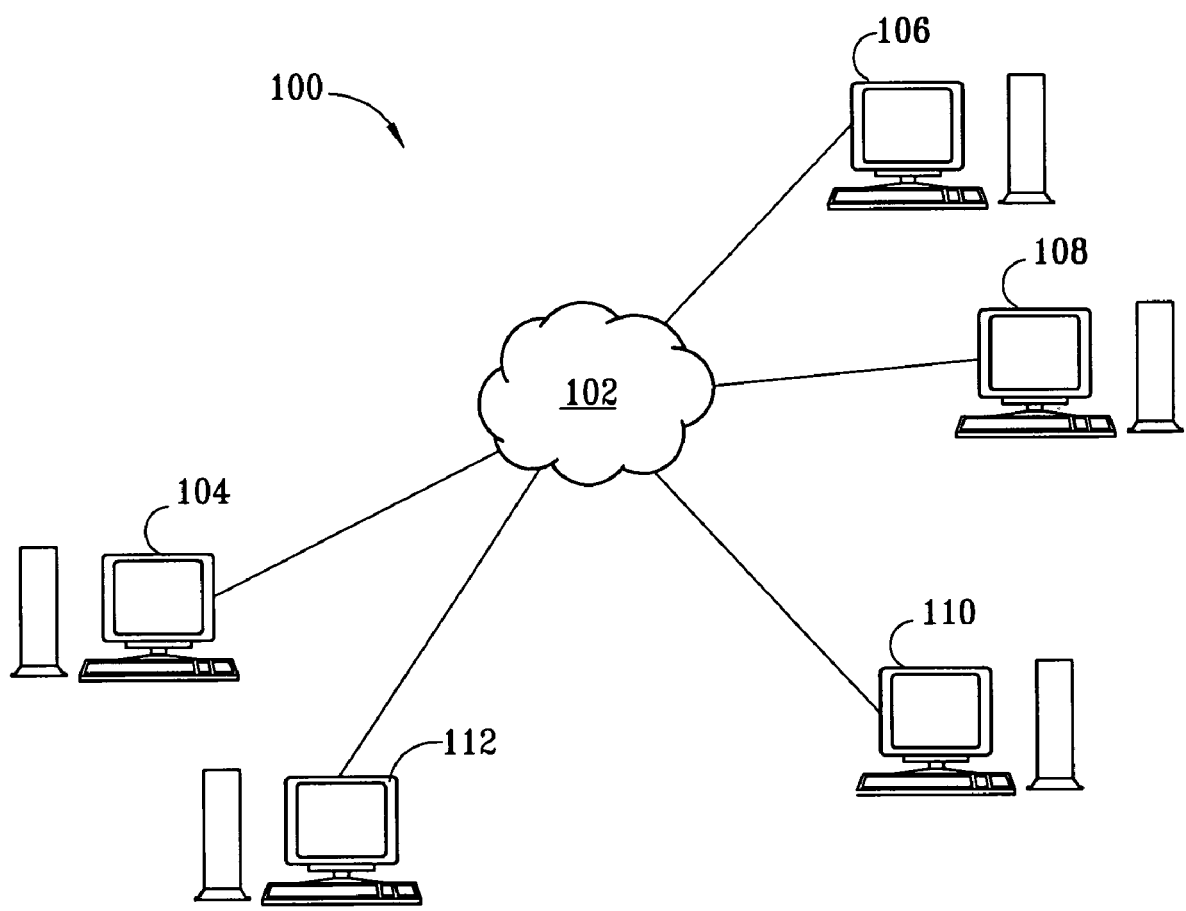
FIG. 1 depicts a computer network in which the invention can be implemented.

FIG. 1 depicts a pictorial representation of a distributed data processing system in which the present invention may be implemented and is intended as an example, and not as an architectural limitation, for the processes of the present invention. Distributed data processing system 100 is a network of computers which contains a network 102, which is the medium used to provide communications links between various devices and computers connected together within distributed data processing system 100. By way of example, distributed data processing system 100 has five computers connected by network 102. First computer 104, second computer 106, third computer 108, fourth computer 1101 and fifth computer 112 are shown as part of 102 distributed data processing system 100. Network 102 may include permanent connections, such as wire or fiber optic cables, or temporary connections made through telephone connections, personal computers, or network computers.

Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as for example, an intranet, a local area network (LAN), or a wide area network (WAN).

Figure 2:
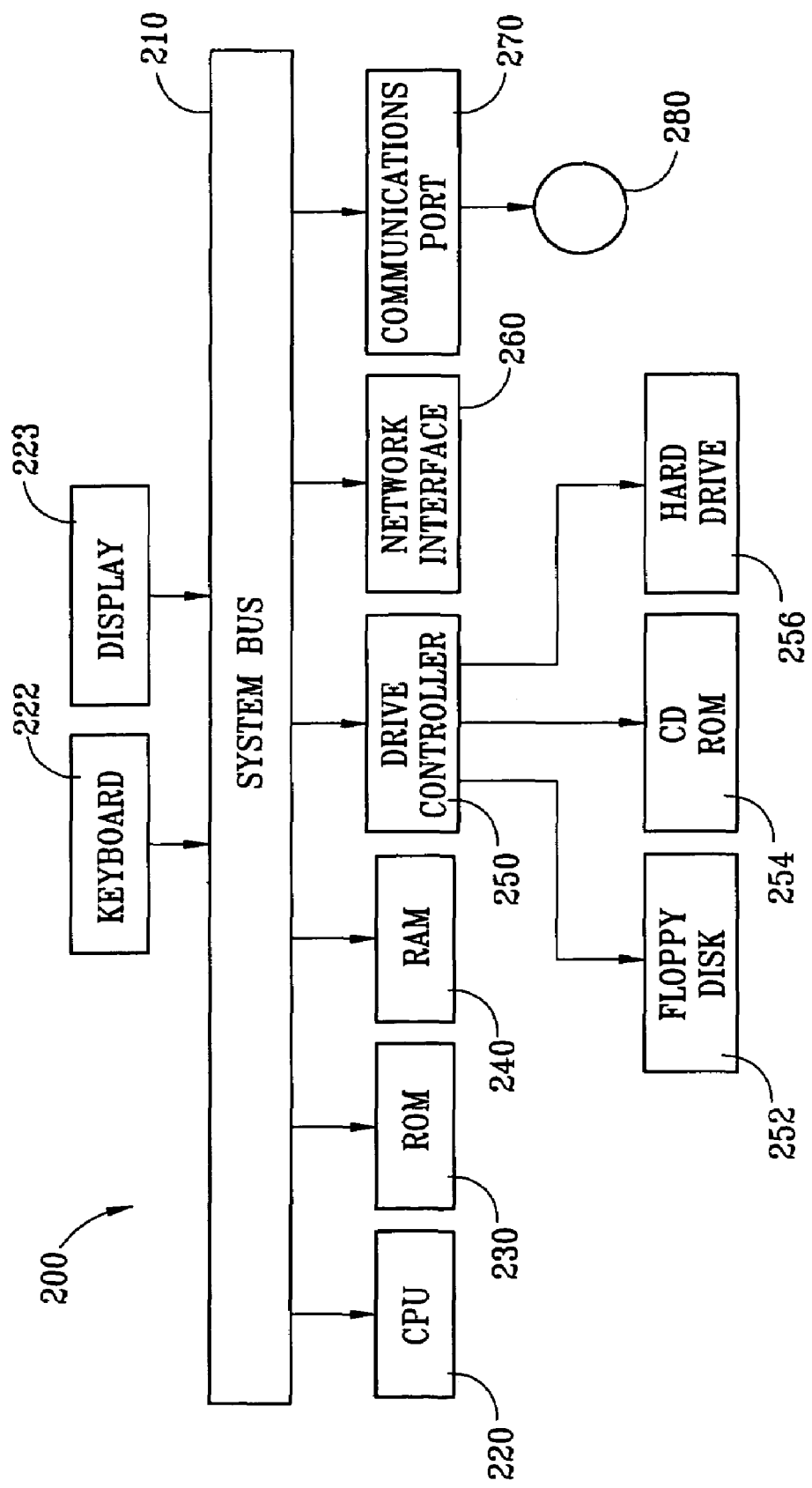
FIG. 2 depicts a computer in which the invention can be implemented.

FIG. 2 depicts computer 200. Although the depicted embodiment involves a personal computer, a preferred embodiment of the present invention may be implemented in other types of data processing systems. An exemplary hardware arrangement for computer 200 follows. Keyboard 222 and display 223 are connected to system bus 210. Read only memory (ROM) 230 contains, typically, boot strap routines and a Basic Input/Output System (BIOS) utilized to initialize Central Processing Unit (CPU) 220 at start up. Random Access Memory (RAM) 240 represents the main memory utilized for processing data. Drive controller 250 interfaces one or more disk type drives such as floppy disk drive 252, CD ROM 254, and hard disk drive 256. The number and type of drives utilized with a particular system will vary depending upon user requirements. A network interface 260 permits communications to be sent and received from a network. Communications port 270 may be utilized for a dial up connection to one or more networks while network interface 260 is a dedicated interface to a particular network 280. Programs for controlling the apparatus shown in FIG. 2 are typically stored on a disk drive and then loaded into RAM for execution during the start-up of the computer.

Figure 3A:
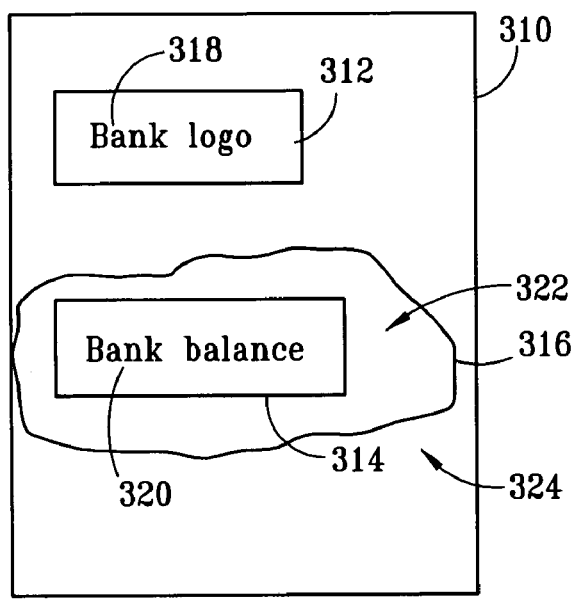
FIG. 3A depicts a first web page from which a first information unit is identified.
Figure 3B:
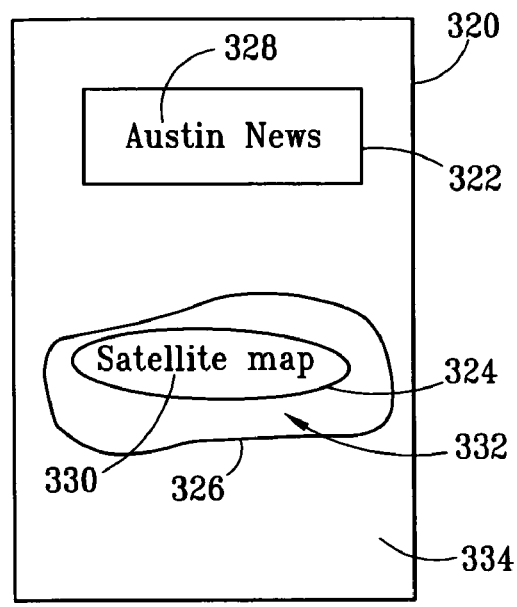
FIG. 3B depicts a second web page from which a second information unit is identified.
Figure 3C:
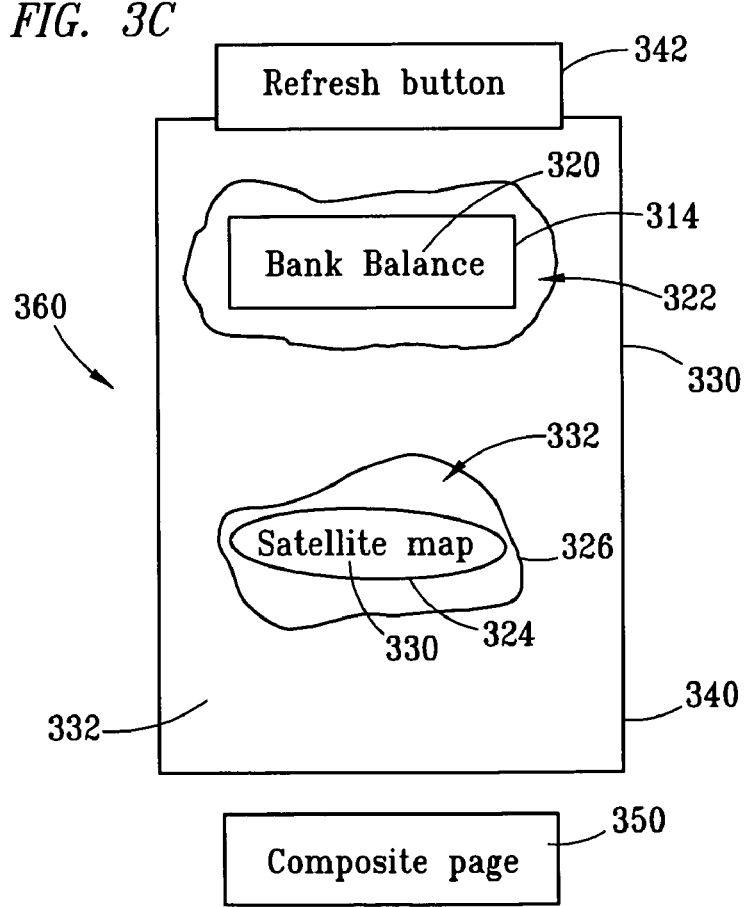
FIG. 3C depicts a canvas web page upon which the first information unit and second information unit are positioned to form a composite web page.

FIGS. 3A through 3C shows the creation of a Composite Web Page (COMPWP) by positioning Information Units (IUs) on a Canvas Web Page (CWP). As used herein an Information Unit (IU) means a portion of a web page that (1) contains an item of information, (2) that has been defined by having a border outlined around the item of information by a cursor, stylus, light pen or touch by the user, and (3) that the remainder of the web page outside the defined boundary of the information unit has been rendered transparent. As used herein, the term information item means data that is displayed on the web page either statically, so that the data remains constant, or dynamically, so that the data is updated automatically or manually. Automatic updating is accomplished by the host web page. Manually updating is accomplished by a host selection device on the host web page that may be linked to an update selection device on the COMPWP such as a refresh button. As used herein, rendering transparent means that the area rendered transparent is clear and can be seen through. In other words, when a portion of a web page is rendered transparent, no part of the original web page can be seen in the area of the web page that has been rendered transparent. When the area surrounding an information unit is rendered transparent, the pixels of the area rendered transparent are stored in memory but are not displayed on the screen. Therefore, an IU is a web page in which all but the relevant portion has been rendered transparent and which web page may be positioned over a Canvas Web Page (CWP). As used herein a CWP is a blank web page upon which IUs may be displayed. A CWP does not need to be a special blank web page. The first web page on which an IU is identified and the remainder of the web page rendered transparent can serve as a CWP with all of the CWP area available except the area where the IU is located. The advantage of starting with a CWP that is a blank page is that various backgrounds may be selected and the positioning of IUs is somewhat easier because the user is not positioning around the first IU. The color or design of the CWP will appear to the viewer through the transparent portions of the IUs. Successive IUs may be positioned one over the other so that the relevant portions within the defined areas which have not been rendered transparent will be visible atop the CWP. A set of IUs that have been positioned atop a CWP will create a Composite Web Page (COMPWP) in which all of the stacked web pages continue to function in their ability to update information but only the selected portions are visible in the COMPWP. The CWP may have a refresh button so that when the COMPWP is established, those IUs requiring manual update may be updated simultaneously by invoking a "refresh" button.

FIG. 3A shows first web page 310 having a first web page first item 312 and a first web page second item 314. First web page 310 is positioned above Canvas Web Page (CWP) 330. CWP 330 is not visible in FIG. 3A. First web page first item 312 has first web page first item content 318 which are the words "Bank Logo" which are meant to represent an image showing the bank logo. First web page second item 314 has first web page second item content 320 which is a bank balance which is a item that is updated periodically. Alternatively, first web page second item content 320 could be updated continuously or manually by invoking an update icon. The relevant information in first web page 310 to the user is the bank balance, i.e. first web page second item content 320. First web page second item boundary 316 has been created by the user by moving the cursor around first web page second item 314 from an initial position in a continuous line until the cursor returns to the initial position. The initial position may be any point along boundary 316. When first web page second item boundary 316 is complete, the user will execute a "make transparent" command. Execution may be accomplished by right clicking the mouse or by invoking a "make transparent" icon, or by selecting a "make transparent" command from a drop down menu. Upon execution of the "make transparent" command, all points of first web page 310 which reside outside of the first web page second item boundary 316 are made transparent and an information unit is created. First information unit 322 consists of first web page second item boundary 316, first web page second item 314, first web page second item content 320 and first web page transparent remainder 324. Once the command "make transparent" is invoked, first web page transparent remainder 324 is not visible and CWP 332 will be visible (see FIG. 3C).

FIG. 3B depicts second web page 320 having second web page first item 322 and second web page second item 324. Second web page first item 322 has second web page first item content 328 which is the logo "Austin News." Second web page second item 324 has second web page second item content 330 which is a satellite map picture which is periodically updated. Alternatively, the satellite map picture could be updated manually or continuously and the degree of updating would depend on the originator of the second web page 320. The relevant information in second web page 320 to the user is the satellite map, i.e. second web page second item content 330. Second web page second item boundary 326 has been created by the user by moving the cursor around second web page second item 324 from an initial position in a continuous line until the cursor returns to the initial position. The initial position may be any point along second web page second item boundary 326. When second web page second item boundary 326 is complete, the user will execute a "make transparent" command. Execution may be accomplished by right clicking the mouse, by invoking a "make transparent" icon, or by selecting a "make transparent" command from a drop down menu. Upon execution of the "make transparent" command, all points of second web page 320 which reside outside of the second web page second item boundary 326 are made transparent and an information unit is created. Second information unit 332 consists of second web page second item boundary 326, second web page second item 324, second web page second item content 330 and second web page transparent remainder 334. Once the command "make transparent" is invoked, second web page transparent remainder 334 is no longer visible and CWP 332 will be seen (see FIG. 3C). In addition, first information unit 322 will be visible through second web page transparent remainder 334.

FIG. 3C depicts COMPWP 360. COMPWP 360 has CWP 330, first information unit 322, second information unit 332, refresh button 342, and Composite Page button 350. Referring to FIG. 3A and FIG. 3B it can be seen that first information unit 322 and second information unit 332 are located in approximately the same area of their respective web pages. Therefore, second information unit 332 would block out all or part of first information unit 322. The user must therefore, move second web page 320 downward on the screen so that second information unit 332 will be positioned beneath first information unit 322. This may be done by dragging second information unit 332 into position. Dragging second information unit 332 which will have the same effect as moving second web page 320 because transparent second web remainder 334 will move along with second information unit 332. When first information unit 322 and second information unit 332 are positioned in the location desired by the user, the user effects the formation COMPWP 360 by clicking on "Composite Page" icon 350 and COMPWP 360 will be saved. COMPWP 360 may be bookmarked for access. When COMPWP 360 is accessed first information unit 322 and second information unit 332 may be updated by clicking on "Refresh button" icon 342. Alternatively, an automatic refresh may be invoked wherein COMPWP 360 will automatically update to the extent permitted by the update capability of the underlying web pages, first web page 310 and second web page 320. "Composite Page" icon 350 and "Refresh button" icon 342 may be located in any number of GUI options such as icons or drop down menus.

Figure 4:
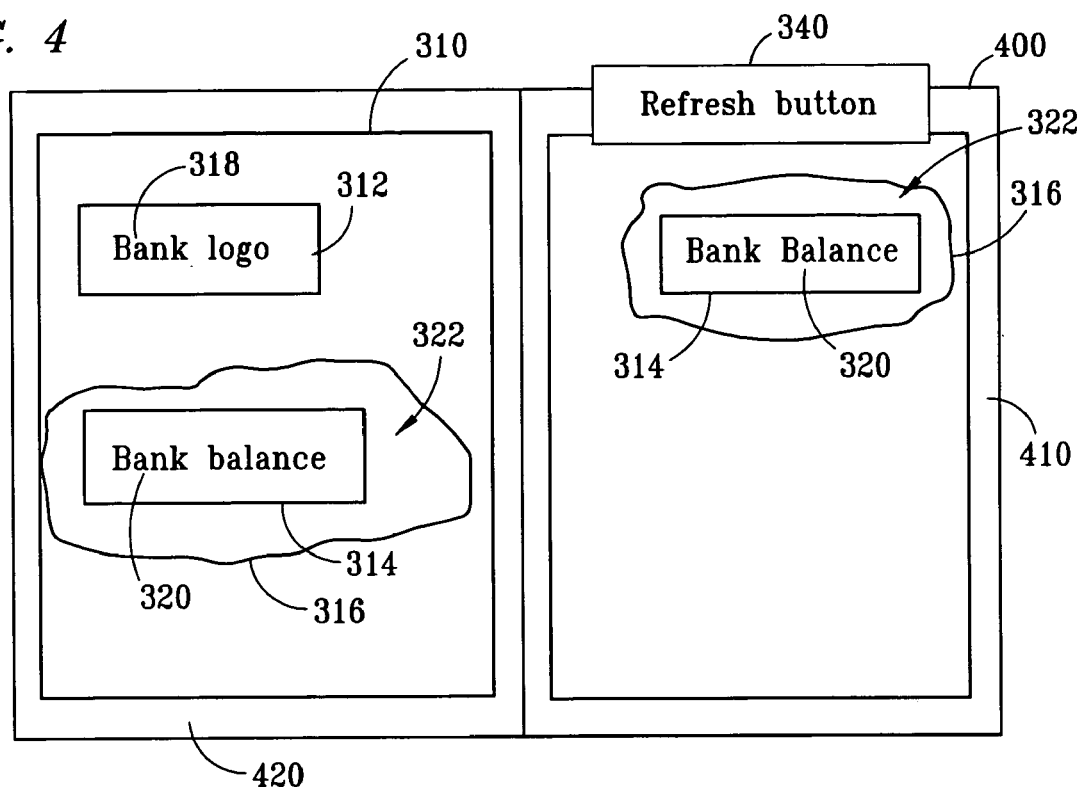
FIG. 4 depicts an alternate canvas web page with a split screen canvas and a split screen work area.

FIG. 4 depicts alternate CWP 400 which has split screen canvas 410 and split screen work area 420. In order to assemble COMPWP 360, the user may invoke alternate CWP 400. The user can then display first web page 310 on the left hand side of the screen. The user would then perform the same operations on first web page 310 to create first information unit 322 as were described above. The user would then drag first information unit 322 from split screen work area 420 to split screen canvas 410.

Figure 5:
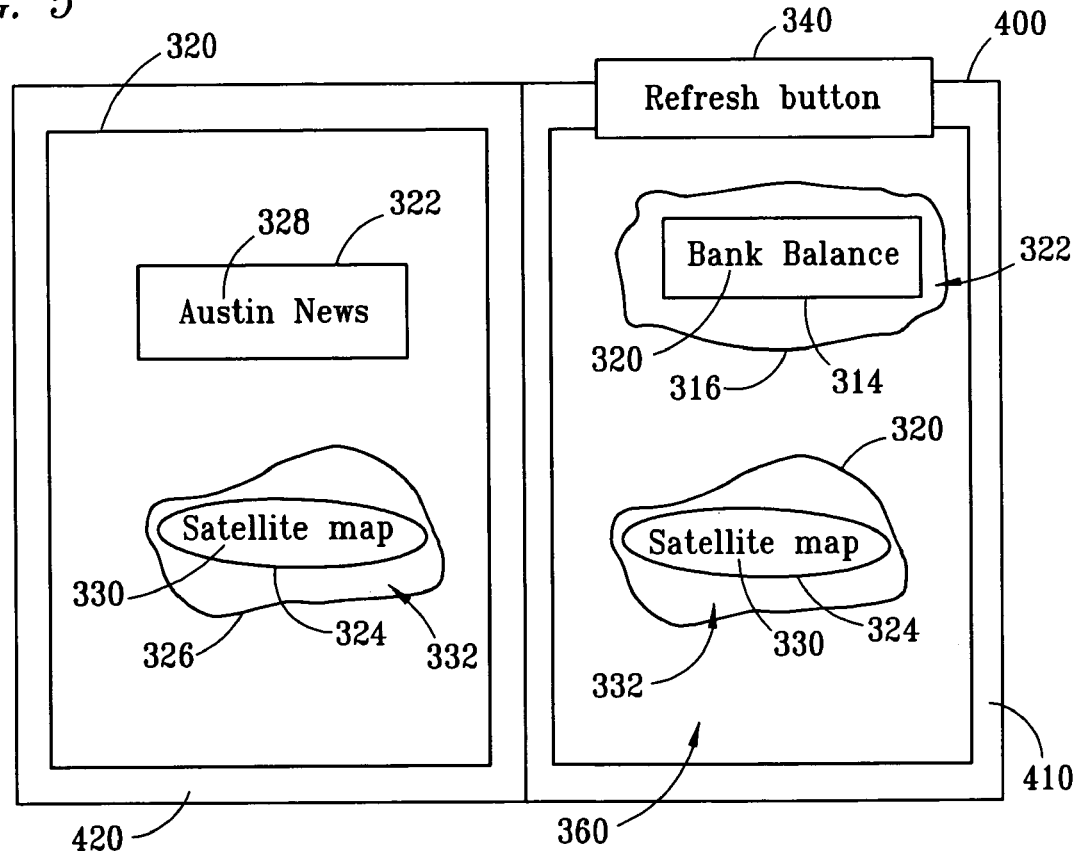
FIG. 5 depicts formation of a composite web site on the alternate canvas web page.

FIG. 5 depicts CWP 400 with second web page 320 displayed in split screen work area 420. In order to create a second information unit, the user would then invoke second web page 320 on the left side of alternate CWP 400 so that second web page 320 would be positioned on split screen work area 420. The user would then perform the same operations on second web page 320 to create second information unit 332 as described above for first information unit 322. The user would then drag second information unit 332 from split screen work area 420 to split screen canvas 410. When second information unit 332 was properly positioned, and if no other information units were to be added, the user could invoke the "Composite Page" icon (not shown in FIG. 5) which could be accessed in any number of GUI manners such as an icon or a drop down menu. Refresh button 340 could be used to update first information unit 322 and second information unit 332. Alternatively, refresh button 340 could be used to invoke an automatic refresh function of COMPWP 360.

Figure 6:
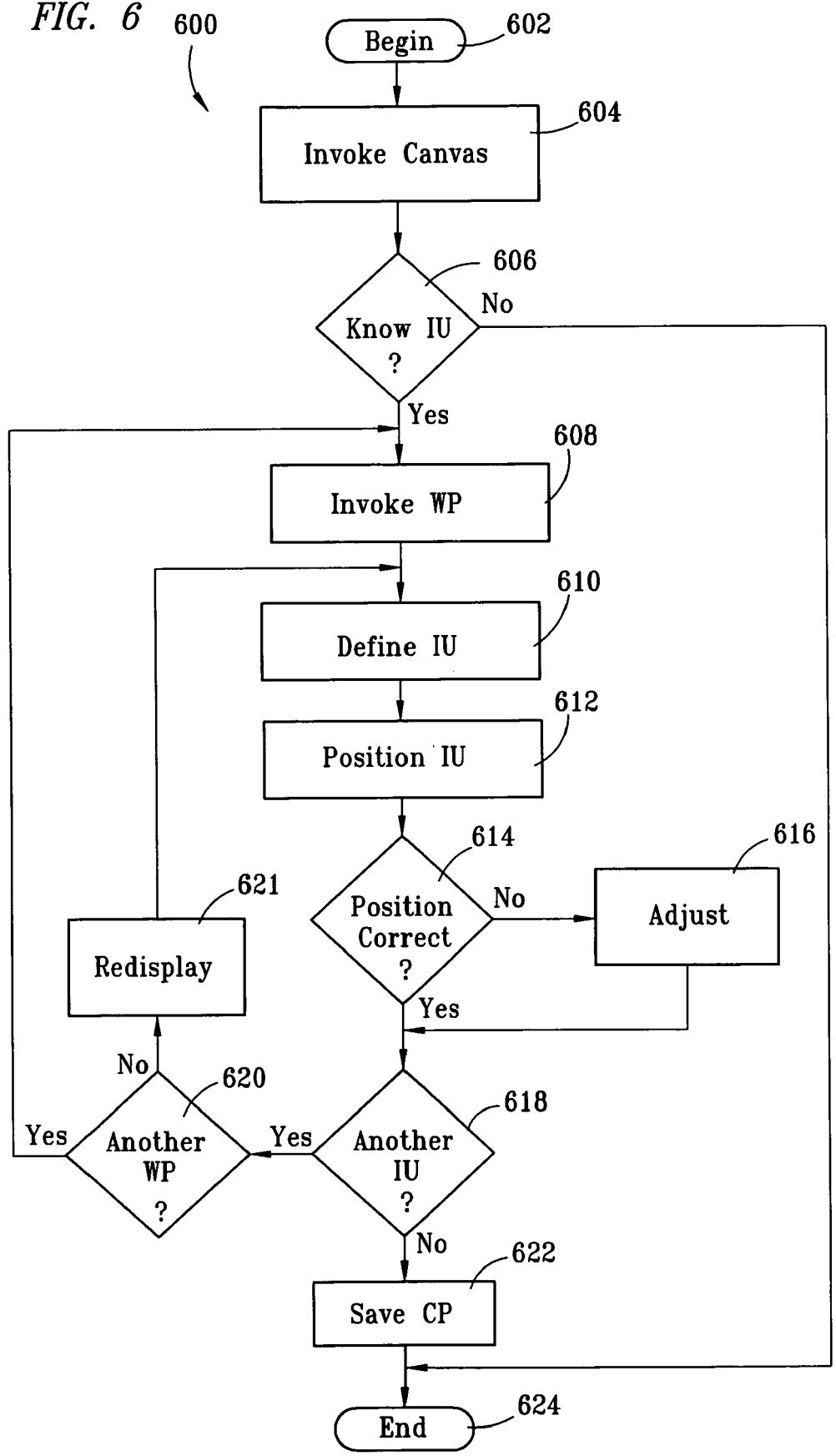
FIG. 6 depicts a flow chart for the formation of a composite web site.

FIG. 6 depicts a flow chart for the program 600 for creating a composite web page such as COMPWP in FIGS. 3C, 4 and 5. The user would invoke the program (602) and the first step would be to invoke a CWP (604). Next, the program queries the user as to whether an IU was known (606). If the user did not have a desired IU, the program proceeds to step 624. If the user had a desired IU, the program would cause the user to invoke the web page containing the desired information (608). Next, the user would define the IU by starting at an initial point and creating a continuous line around the desired information item until the line comes back to the initial point to completely enclose the information item (610). The user would then position the IU by dragging it into position on the CWP (612). Next, the user would determine whether the position of the IU was correct (614). If the position were not correct, the user would drag the information unit to adjust the position until the position was correct (616). If the position was correct, or if the position has been made correct by step 616, the program will determine whether the user desires to position another IU (618). If the user desires to position another IU, the program will determine whether or not the IU will come from the same web page as the previous IU or whether the IU will come from a new web page (620). If the IU is to come from the same web page as the previous web page, the program will redisplay the existing web page to allow another selection (621) and then the user will define the IU (610). If the IU is to come from a new web page, the program will return to step 608 and the user will invoke the new web page. If at step 618 the user does not want to add another IU, the program will save the composite web page (622) and the process for forming the composite page will end (624).

Figure 7:
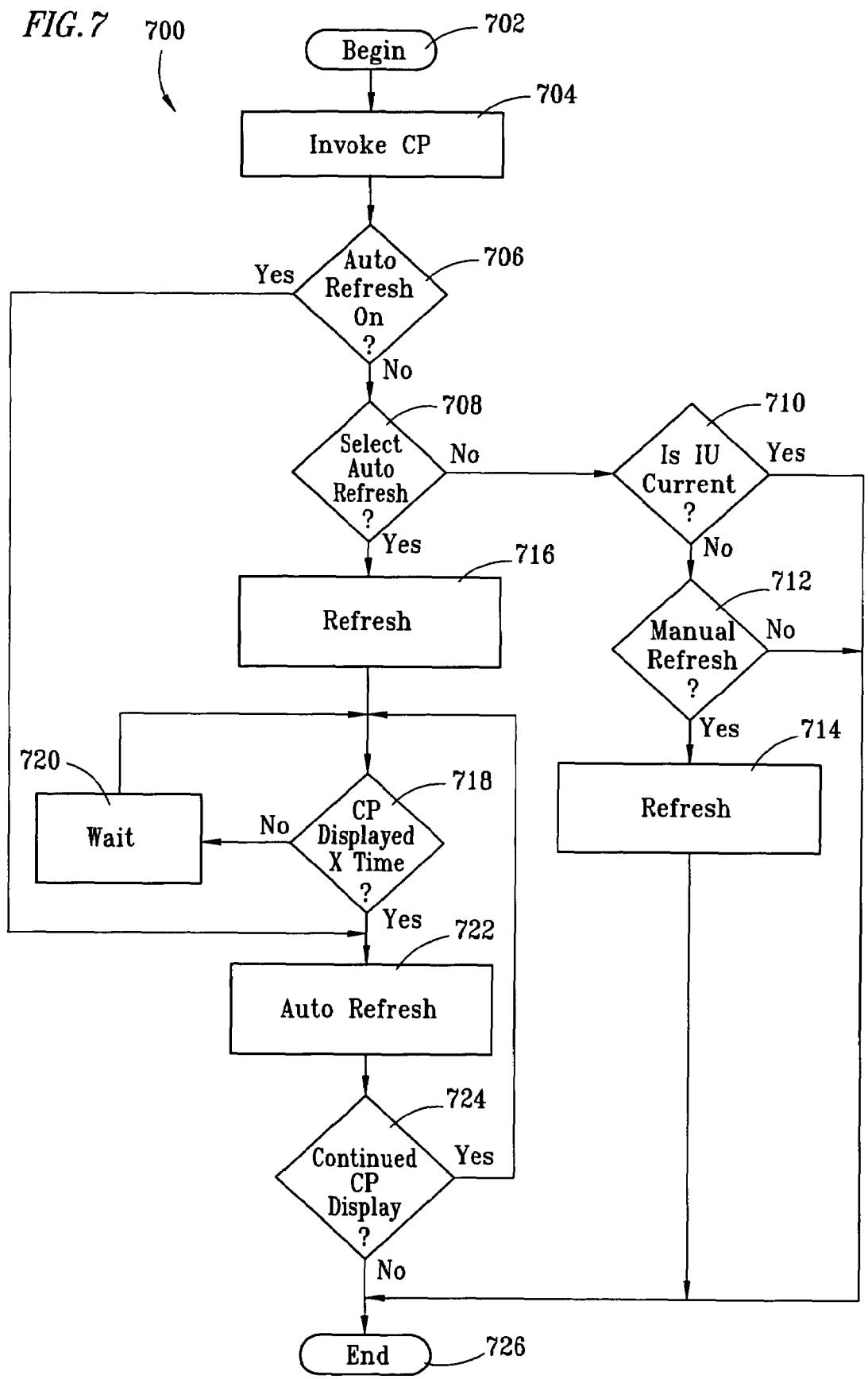
FIG. 7 depicts a flow chart for the selection of the manner of refreshing the information units in the composite web page.

FIG. 7 depicts the process 700 for selecting the mode of refreshing (updating) the information items in the composite web page. The process begins 702 when a composite web page such as COMPWP 360 in FIGS. 3C, 4 and 5 is invoked (704). Alternatively, process 700 may be initiated after step 622 of program 600. The program determines whether the automatic refresh has been turned on (706). If the automatic refresh has already been turned on, the program goes to step 722 and will automatically refresh (722). If the composite web page is not continuing to be displayed (724), the program will end (726). If at step 706 the automatic refresh is not on, the program will query the user as to whether or not the user wants to select the automatic refresh (708). If the user selects automatic refresh, the program will invoke the most recent available data from the underlying web sites (716). The program will then determine whether the composite web page has been displayed for a predetermined amount of time "x" (718) If the composite web page has not been displayed for a predetermined amount of "x" (720), then the program will wait for a predetermined unit of time and then go to step 718 to again determine whether or not the composite web page has been displayed for predetermined amount of time "x". If the composite web page has been displayed for the predetermined amount of time "x" then the program will invoke the most recent available data from the underlying web sites (722). The program will determine whether or not composite web page continues to be displayed (724). If the composite web page does not continue to be displayed, then the program will end (726). If the composite web page continues to be displayed, then the program will go to step 718 and determine whether or not the composite web page has been displayed for pre-determined time "x".

At step 708, if the user does not select automatic refresh, then the program will determine whether or not the IU is current (710). If the IU is current, the program will end (726) and wait for the next time the composite web page is invoked. If the IU is not current, the program will determine whether the user wants to manually refresh the IUs (712). If the user wants to manually refresh the IUs then, the user will invoke the refresh icon and the program will invoke the most recent available data from the underlying web sites (714). The program will then end (726) until the next time the composite web page is invoked. If the user does not want to manually refresh the IUs, the program will then end (726) until the next time the composite web page is invoked.

The advantages provided by the present invention should be apparent in light of the detailed description provided above. The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method for display of one or more information items comprising the steps of:

Invoking a first web page;

Identifying a first information unit by creating a continuous lines around a first information item on said web page so that said web is divided into said first information unit and a first web page remainder;

Rendering said first web page remainder transparent;

Displaying a multi-part graphical user interface (GUI) comprising a split screen work area and a split screen canvas;

Dragging said first information unit to a canvas web page;

Positioning said first information unit on the canvas web page;

Wherein the first web page is layered with a second web page comprising a second information unit and a second web page remainder Wherein the first information unit and the second information unit are visible through the transparent first web page remainder;

Wherein the canvas webpage is located on the split screen canvas; and

Wherein the first web page is located on the split screen work area.

2. The method of claim 1 further comprising:

invoking the second web page;

identifying the second information unit by creating a continuous line around a second information item on said second web page so that said second web page is divided into said second information unit and a second web page remainder;

rendering said second web page remainder transparent;

positioning said second information unit relative to said first information unit by dragging; and wherein the first information unit and the second information unit are visible through the transparent second web page remainder.

3. A method for aggregating multiple information items on a display screen of a computer connected to the internet comprising the steps of:
   displaying a multi-part graphical user interface (GUI) comprising a split screen work area and a split screen canvas;
   invoking a canvas web page in the split screen canvas;
   invoking a first web page in the split screen work area;
   identify a first information unit on said first web page so first said first web page is divided into said first information unit and a first web page remainder;
   rendering said first web page remainder transparent;
   invoking a second web page;
   identifying a second information unit on said second web page so that said second web page is divided into said second information unit and a second web page remainder; and
   rendering said second web page remainder transparent; and
   wherein a user can sun simultaneously view the canvas web page and the first web page on the GUI.

4. The method of claim 3 further comprising dragging said first information unit to said canvas web page and positioning said first information unit on the canvas web page.

5. The method of claim 3 further comprising dragging the second information unit to said canvas web page and positioning the second information unit on the canvas web page.

6. The method of claim 3 further comprising saving said canvas web page, said first information unit, and said second information unit as a composite web page.

7. The method of claim 3 further comprising: updating said first information unit.

8. The method of claim 3 further comprising: updating said second information unit.

9. A programmable apparatus for display and simultaneous update of multiple information units comprising, programmable hardware comprising:
   a computer connected to a network;
   a display screen connected to said computer;
   a program installed on said computer;
   wherein responsive to said program contains instructions comprising:
   instructions for displaying a multi-part graphical user interface (GUI) comprising a split screen work area and a split screen canvas;
   instructions for invoking a canvas web page in the split screen canvas;
   instructions for invoking a first web page in the split screen work area;
   wherein a user can simultaneously view the split screen work area and the split screen canvas;
   wherein an information unit is identified on the first web page;
   wherein said information unit is moved to the canvas web page
   wherein the first web page is layered with a second web page on the canvas web page, the second web page comprising a second information unit and a second web page remainder;
   wherein the first web page remainder and the second web page remainder are rendered transparent; and
   wherein the first information unit and the second information unit are visible through the transparent first web page remainder and the transparent second web page remainder.

10. The programmable apparatus of claim 9 wherein said information unit is identified by creating a continuous line around the information item on said web page so that said web page is divided into said information unit and a remainder; and said remainder is rendered transparent.

11. The programmable apparatus of claim 9 wherein a second web page is acquired from said network and a second information unit is identified from the second web page;
   wherein a first web page remainder of said first web page is rendered transparent;
   wherein a second web page remainder of said second web page is rendered transparent;
   wherein said first information unit is positioned on said canvas web page and said second information unit is positioned on said canvas web page so that said canvas web page is visible through said first web page remainder and said second web page remainder; and
   wherein said first information unit is visible through said second web page remainder.

12. A computer readable memory for display and simultaneous update of multiple information units comprising:
   a computer readable storage medium;
   a computer program stored in said storage medium;
   the storage medium, so configured by said computer program, causes the computer;
   to display a multi-part graphical user interface (GUI) comprising a split screen work area and a split screen canvas;
   to invoke a canvas web page in the slit screen canvas;
   instructions for invoking a first web page in the split screen work area;
   to acquire a web page from said network and display said web page in a display screen;
   to identify an information unit on the web page;
   to position said information unit on a canvas web page;
   to acquire from said network a second web page;
   to identify a second information unit on the second web page;
   to cause a first remainder of said first web page to be transparent;
   wherein a user can simultaneously view the split screen work area and the split screen canvas; and
   wherein said program is adapted for dragging of said first information unit and said second information unit by a user, so that responsive to said dragging, said program positions said first information unit on said canvas web page and positions said second information unit on said canvas web page so that said canvas web page is visible through said first remainder and said second remainder and said first information unit is visible through said second remainder.

* * * * *

UNITED STATES PATENT AND TRADEMARK OFFICE
CERTIFICATE OF CORRECTION

| | |
|---|---|
| PATENT NO. | : 7,065,713 B1 |
| APPLICATION NO. | : 09/710927 |
| DATED | : June 20, 2006 |
| INVENTOR(S) | : Dutta |

It is certified that error appears in the above-identified patent and that said Letters Patent is hereby corrected as shown below:

Col. 3, line 65: "1101" should be--110--

Col. 3, line 65; delete "102"

Col. 7, line 9: "COMPWP" should be--COMPWP 360--

Col. 9, line 13: "first said" should be--that said--

Col. 9, line 20: delete "and"

Col. 9, line 23: delete "sun"

Co. 10, line 50: insert after "transparent" --to cause a second remainder of said second web page to be transparent--

Signed and Sealed this

Twenty-sixth Day of September, 2006

JON W. DUDAS
*Director of the United States Patent and Trademark Office*